US008830576B1

(12) United States Patent
Morton et al.

(10) Patent No.: US 8,830,576 B1
(45) Date of Patent: Sep. 9, 2014

(54) VIEWING DEVICE SYNCHRONIZER

(75) Inventors: Scott A. Morton, Laramie, WY (US); Samuel J. Marcy, Cheyenne, WY (US)

(73) Assignee: University of Wyoming, Laramie, WY (US)

( * ) Notice: Subject to any disclaimer, the term of this patent is extended or adjusted under 35 U.S.C. 154(b) by 786 days.

(21) Appl. No.: 11/086,098

(22) Filed: Mar. 22, 2005

Related U.S. Application Data

(60) Provisional application No. 60/555,447, filed on Mar. 22, 2004.

(51) Int. Cl.
*G02B 23/00* (2006.01)
(52) U.S. Cl.
USPC .......................................... 359/429; 359/399
(58) Field of Classification Search
USPC .......................................................... 359/429
See application file for complete search history.

(56) References Cited

U.S. PATENT DOCUMENTS

| 6,252,544 | B1* | 6/2001 | Hoffberg | 342/357.1 |
| 7,690,145 | B2* | 4/2010 | Peters et al. | 42/111 |
| 2004/0109007 | A1* | 6/2004 | Griss et al. | 345/629 |
| 2004/0160512 | A1* | 8/2004 | Lee et al. | 348/42 |
| 2006/0010697 | A1* | 1/2006 | Sieracki et al. | 33/267 |
| 2013/0046461 | A1* | 2/2013 | Balloga | 701/438 |

* cited by examiner

*Primary Examiner* — Arnel C Lavarias
(74) *Attorney, Agent, or Firm* — Samuel M. Freund; Cochran Freund & Young LLC

(57) ABSTRACT

A viewing device synchronizer includes a viewing mechanism for viewing an object and a linking mechanism for linking a plurality of viewing mechanisms so that each is capable of viewing the object simultaneously. A movement mechanism moves a single viewing mechanism in any direction in order to view an object. A control mechanism moves any of the plurality of viewing mechanisms if the single viewing mechanism is moved. A directional pointing mechanism controls one or a plurality of the viewing mechanisms. A communication mechanism sends directional information for controlling the operation of the plurality of viewing mechanism from a single viewing mechanism.

7 Claims, 4 Drawing Sheets

Conceptual system configuration and user views of a wireless electronic synchronization system for optical viewing devices.

Conceptual system configuration and user views of a wireless electronic synchronization system for optical viewing devices.

Electronic block diagram of wireless
synchronization system for optical viewing devices

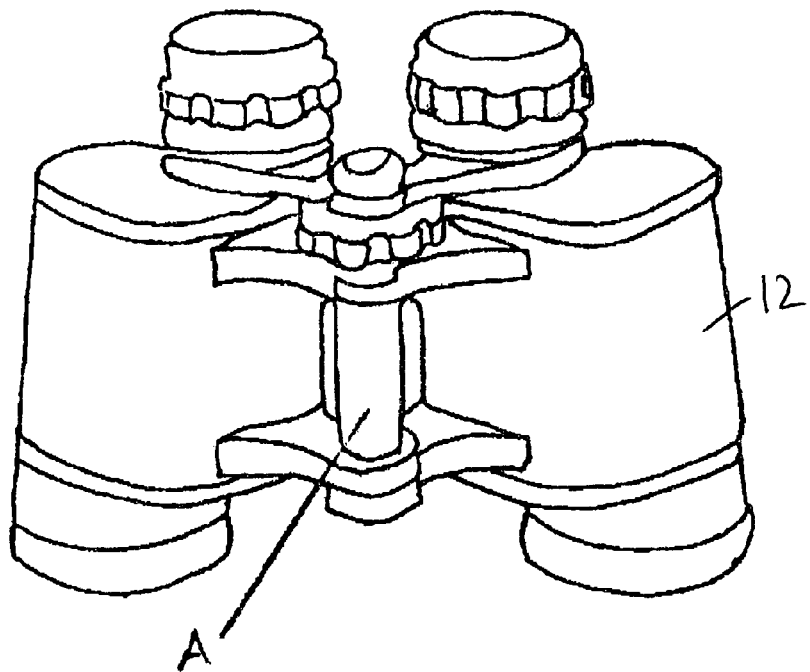

FIGURE 3    PRIOR ART

A - Hinge
B - Hinge cradle
C - Pedestal and the short members of the four bar linkage
D - Combination long member of the four bar linkage and torsional and bending stiffness member
E - Other long member of the four bar linkage
F - Four bar linkage pins - Large
G - Four bar linkage pins - Small
H - Binocular Securing Apparatus. With proper linkage (not shown) it could snap over center and be fast acting.
Ha  Seat for Securing apparatus bar.
J   Binocular Securing means with socket head cap screws
K   Snap rings for four bar pin connections.

VIEWING DEVICE SYNCHRONIZER

The present application is a continuation-in-part of provisional patent application Ser. No. 60/555,447, filed on Mar. 22, 2004, entitled "Binocular Synchronizer".

BACKGROUND OF THE INVENTION

1. Field of the Invention

The present invention relates to the field of optical viewing and, more particularly, the present invention provides a system and method for mechanically and electrically synchronizing multiple vision enhancement systems (binoculars, spotting scope, telescope, monoculars, cameras, video recorder, etc) in order to simultaneously view the same object.

2. Description of the Prior Art

Optical viewing devices, such as binoculars, monoculars, spotting scopes, and cameras, are frequently used by individuals and organizations to observe objects that are beyond a distance that would permit them to be seen adequately by the naked eye. These devices are extremely convenient and a necessity to those that rely on them daily.

Unfortunately, in many cases it is very difficult for multiple users of viewing devices to find and view the same object, even when they are standing side by side. This difficulty arises because of many reasons including: the skill of the user, distance to the object, altitude, visibility, atmospheric conditions, and even height of the viewer. When multiple users of viewing devices are separated even further the difficulty in simultaneously viewing the same object seems to increase proportionate to the distance of their separation.

There exists a need in the art for a device that can be used by one individual and that can supply position, azimuth, inclination, and range information to other such devices used by one or more other individuals through either a mechanical or electronic link, so that others may easily locate the object that is being viewed by the first individual. This technology could have significant impact for military purposes, for hunters, birdwatchers and other groups who use binoculars, spotting scopes and cameras to observe objects and who might wish to quickly and easily have others in the group locate objects spotted by a member of the group. There is a very broad and diverse potential user base.

The principle novel and unusual features would be a means to quickly and easily direct a person or persons using viewing devices such as binoculars or spotting scopes to the azimuth and inclination of an object sighted by an individual using a viewing device equipped with one of these devices.

SUMMARY

The present invention is a viewing device synchronizer apparatus for synchronizing a plurality of viewing devices. The apparatus comprises at least one link member between each viewing device. Rotational elements operably connect between each end of the linking arm and each viewing device wherein the rotational elements allow a change in direction of one of the viewing devices that links to a second of the viewing devices to rotate the directional orientation of the second viewing devices such that each viewing device is simultaneously pointed at the same given object.

In addition, the present invention includes a viewing device synchronizer comprising viewing means for viewing an object, linking means for linking a plurality of viewing means so that each is capable of viewing an object simultaneously, movement means for moving a single viewing means in any direction in order to view an object, control means for moving any of the plurality of viewing means if a single viewing means is moved, directional pointing means for controlling one or a plurality of the viewing means, and communication means for sending directional information and controlling the operation of the plurality of viewing means from a single viewing means.

Furthermore, the present invention includes a viewing device synchronizer comprising at least one viewing device, an electronic compass for indicating direction, an electronic level for indicating an angle of direction as measured from horizontal, an electronic rangefinder for indicating a distance to an object, a global positioning unit, a microcontroller, a power supply, and a network communication link.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

FIG. 3 is a front perspective view showing a typical binocular unit; and

DETAILED DESCRIPTION OF THE PREFERRED EMBODIMENTS

Figure 1:
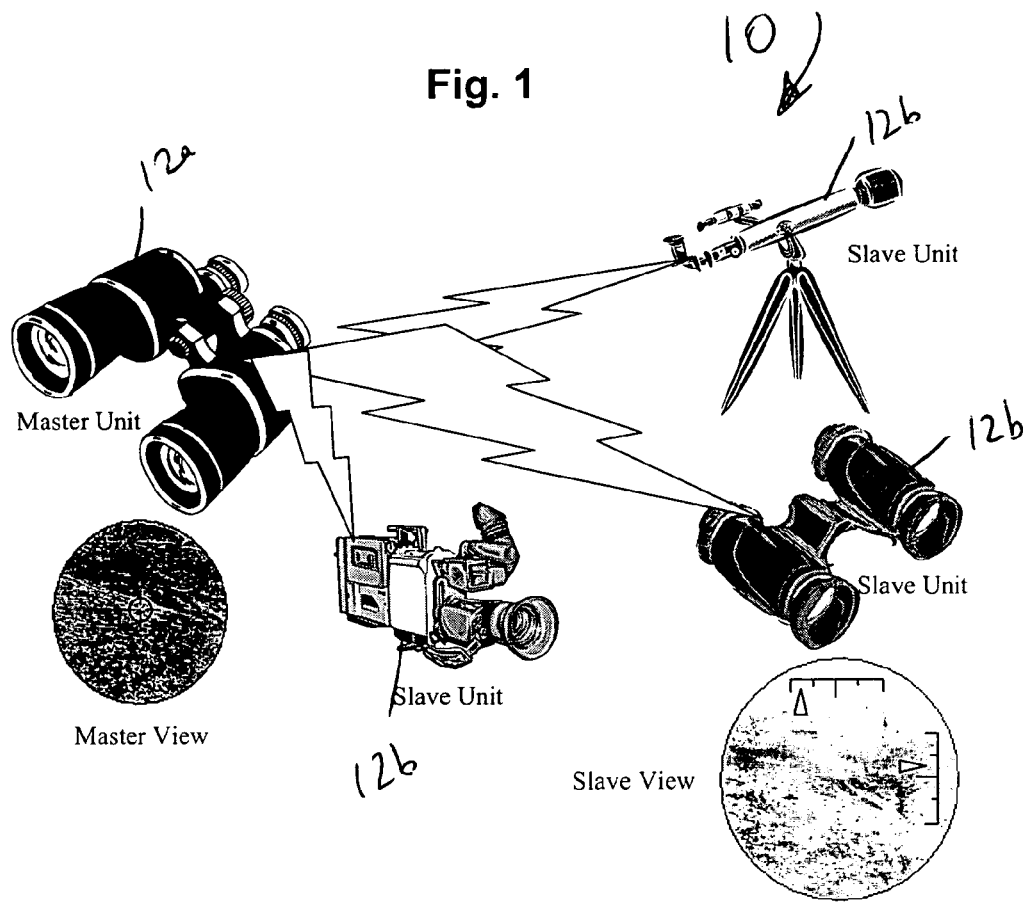
FIG. 1 is a conceptual system configuration and user views illustrating a wireless electronic synchronization system for optical viewing devices, constructed in accordance with the present invention.
Figure 2:
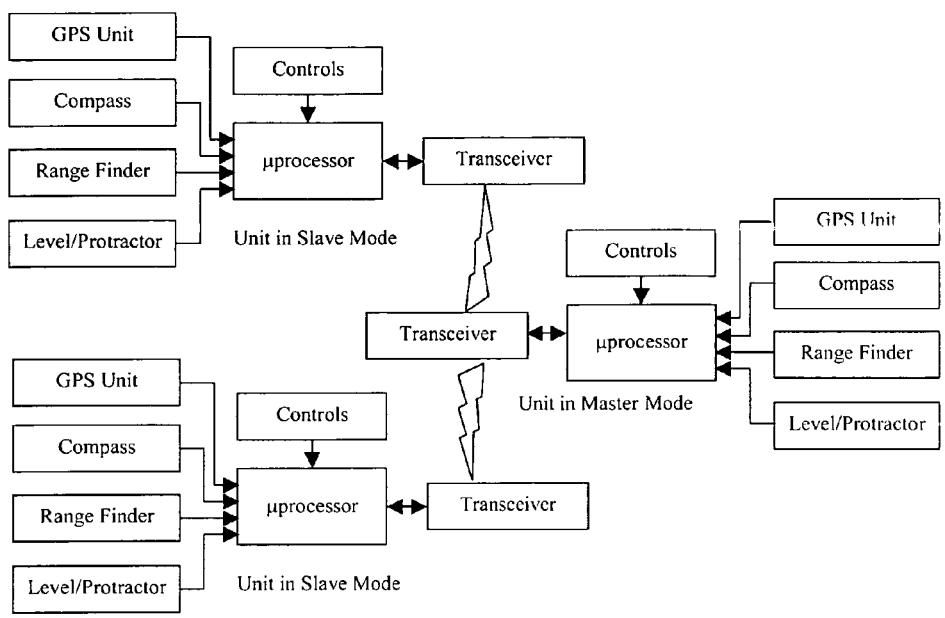
FIG. 2 is an electronic block diagram illustrating a wireless synchronization system for optical viewing devices, constructed in accordance with the present invention.
Figure 4:
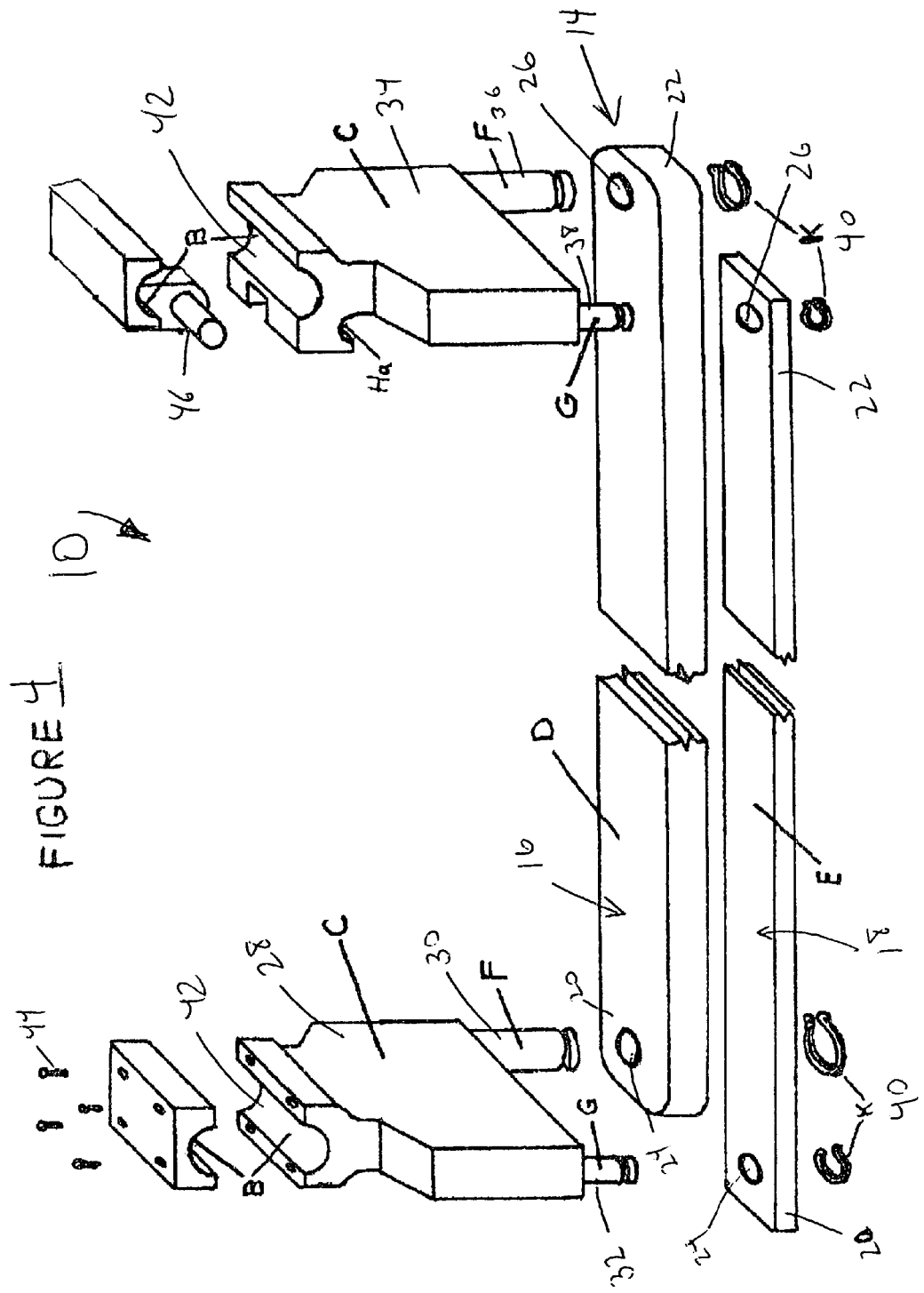
FIG. 4 is an exploded perspective view illustrating a mechanical embodiment of the viewing device synchronizer, constructed in accordance with the present invention.

As illustrated in FIGS. 1, 2, and 4, the present invention is a method and linking apparatus 10 for linking multiple viewing devices 12 together such that each viewing device 12 is simultaneously capable of viewing the same object or point in space as each of the other viewing devices 12. The viewing device 12 includes, but not limited to, binoculars, monoculars, spotting scopes, telescopes, video cameras, and electronic recording devices. The linking apparatuses 10 can be either mechanical or electronic allowing for linking multiple viewing devices 12 for autonomous viewing by means of a communications network that supplies direction, distance, altitude, and GPS location to other viewing devices 12 on the network.

In a first mechanical embodiment, the linking apparatus 10 is a rigid connection between the viewing devices 12. Once the calibration for the proper lines of sight is achieved, the viewing devices 12 would move in tandem such that the object viewed by the master viewing device 12a would also be viewed by the slave viewing device 12b. For example, when the master viewing device 12a is scanning the horizon, the slave view device 12b would also scan the horizon on the same sight line as the master viewing device 12a.

As illustrated in FIG. 4, in a second mechanical embodiment, the linking apparatus 10 of the present invention provides a lightweight frame unit 14 that rotationally connects the optical viewing units 12 so that when the master viewing device 12a is directed at a particular object, the slave viewing device 12b is also pointing at the same object.

The frame unit 14 of the present invention includes a "four bar linkage" wherein the corners of the frame unit 14 consist of essentially a parallelogram. Each viewing device 12, i.e., the master viewing device 12a and the slave viewing device 12b, can rotate within the plane defined by the lines of sight without significant translation. Vertical scanning rotates each viewing device 12 in a substantially up and down manner.

The frame unit 14 includes a first link member 16 and a second link member 18 with the first link member 16 being substantially parallel to the second link member 18. The first link member 16 and the second link 18 member each include a first end 20 and a second end 22. The first ends 20 of the first link member 16 and the second link member 18 each have a first aperture 24 and the second ends 22 of the first link member 16 and the second link member 18 each have a second aperture 26.

In addition, the frame unit 14 includes a first pedestal 28 having a first linkage pin 30 and a second linkage pin 32 and a second pedestal 34 having a first linkage pin 36 and a second linkage pin 38. The first linkage pin 30 of the first pedestal 28 is rotatably receivable within the first aperture 24 of the first link member 16 and the second linkage pin 32 of the first pedestal 28 is rotatably receivable within the first aperture 24 of the second link member 18. The first linkage pin 36 of the second pedestal 34 is rotatably receivable within the second aperture 26 of the first link member 16 and the second linkage pin 38 of the second pedestal 34 is rotatably receivable within the second aperture 26 of the second link member 18. Securing means 40, i.e., snap rings, are positioned about the linkage pins 30, 32, 36, 38 to releasably maintain the connection between the first pedestal 28 and the first and second link members 16, 18 and the second pedestal 34 and the first and second link members 16, 18.

Furthermore, the frame unit includes a hinge cradle 42 for securing the frame unit 14 to the viewing devices 12. Attachment means 44, such as screws or the like, releasably secure the viewing devices 12 to the frame unit 14.

While it has been illustrated herein that the frame unit 14 can synchronize two viewing devices 12 together, it is within the scope of the present invention to construct the frame unit 14 to synchronize a plurality of viewing devices 14. The number of viewing devices 14 synchronized together is not limited by the description or drawings herein.

In a second mechanical embodiment, the linking apparatus is a lightweight frame attachable to a stabilizing surface or stationary object of sufficient mass to provide stabilization with a securing apparatus 46. Alternatively, two or more individuals can hold or otherwise secure the frame. Two or more optical viewing devices 12 can be rotatably mounted, in both azimuth and inclination, to the frame and connected by a suitable linkage, such as a parallel bar linkage, so that a slave optical viewing device 12b remains in the same orientation as the master viewing device 12a whenever the master viewing device 12a is moved. With suitable linkages, the master/slave relationship could be interchangeable. Alternatively, frame mounted controls could move the optical viewing devices 12. The controls can be accessible to all users or only to the master viewing device user.

As illustrated in FIGS. 1 and 2, a third optical viewing device synchronization embodiment is an electronic circuit that includes an electronic compass, an electronic level/protractor (inclinometer), an electronic rangefinder, a GPS unit, a microcontroller, and a network communication link. Preferably, the network communication link is a wireless link. However, a wire or fiber optic link could also be used, particularly for ultra-secure transmission situations. Established, standard network and wireless protocols, such as IEEE 802.3 local area network protocols and Bluetooth wireless protocols can be used, or proprietary protocols can be developed for security or exclusivity reasons.

The electronic circuit can be built into the housing of the optical viewing device 12 and powered by battery power, photovoltaic cells, or other source of low voltage DC electric power. In response to a control action, latitude, longitude, and elevation on the surface of the earth supplied by the GPS unit from which the magnetic declination angle can be found using lookup tables or calculated from an International Geomagnetic Reference Field mathematical models, distance to the target supplied by the rangefinder, inclination to the target supplied by the electronic level, and magnetic bearing information supplied the electronic compass are used to calculate the vector to the target by means of a microprocessor. The location parameters of the master viewing device 12a unit and the vector parameters from the master unit to the target can then be transmitted over the network to other optical viewing devices 12 similarly equipped.

The slave viewing devices 12b, when they receive such data, can calculate the azimuth and inclination to the target by means of the microprocessor and vector algebra using the positional information from the GPS and directional information from the inclinometer and compass in the slave viewing device 12b. The microprocessor can then generate field-of-view indicators that 1) show the user in what directions, left or right and up or down and 2) relatively how far to move the optical viewing device 12 to locate the object. Any one unit in the network could operate as the master viewing device 12a by virtue of sending positional information.

Once the target object has been located by any or all of the slave viewing devices 12b units and in response to a control action by a particular slave viewing device user, the range to the object from that slave viewing device position could be measured with the rangefinder and the vector parameters calculated for the slave viewing device position. These vector parameters and the slave viewing device location parameters can then be transmitted to the master viewing device 12a and other slave viewing devices 12b. This additional location information will allow each viewing device 12 in the network to refine the calculated coordinates of the object more precisely by spatial triangulation. Multiple positions for triangulation can correspondingly decrease the error of location of the target and also identify those users who may have focused on the incorrect target.

A second mode of operation is possible by a control setting whereby a viewing device 12 would continually transmit data as a master viewing device 12a. In this case, the field-of-view indicators in the other viewing devices 12 in the network continually update in the slave mode. Range finders include, but are not limited to, optical split image, laser ranging, acoustic ranging, or eye tracking type in the case of a binocular system. Compasses can be digital compasses, level/protractors can be digital protractors such as electrolytic tilt sensors or accelerometer tilt sensors, and GPS units standard GPS units. Some or all of these sensors can be integrated into combination sensors. Wireless networking devices can be standard units, perhaps conforming to a published standard such as Bluetooth protocol or IEEE 802.3 local area network protocol. Since coordinate information requires very little bandwidth for transmission, audio information can be transmitted over the wireless connection to allow voice communications between optical viewing device users when they are widely separated. A microprocessor performs the spatial vector calculations, updates the user interface display, performs control functions, and controls the network data transmissions. A memory function allows a single user to return to the same view thereby allowing a user or multiple users to spatially and/or temporally synchronize a viewing device 12 or multiple viewing devices 12 for later observation.

The conceptual view for binocular users in such a system is shown in FIG. 1 and a block diagram of the electronic modules for such a system is shown in FIG. 2.

A fourth electronic/mechanical combination embodiment includes optical viewing device slave units 12b rotatably mounted, in both azimuth and inclination, to fixed supports and positioned with servomotors in response to signals transmitted from a master viewing device 12a. Such slave viewing devices 12b operate in conjunction with electronic devices of the third embodiment The preceding description has been presented only to illustrate and describe embodiments of invention. It is not intended to be exhaustive or to limit the invention to any precise form disclosed. Many modifications and variations are possible in light of the above teaching.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A viewing device synchronizer for finding a position of an object remote from the viewing device synchronizer, the viewing device synchronizer comprising:
    at least one viewing device;
    an electronic compass for indicating direction from the viewing device to the remote object;
    an electronic level for indicating an angle of direction from the viewing device to the remote object as measured from horizontal;
    an electronic range finder for indicating a distance to the remote object from the viewing device, the compass, level and rangefinder determining a vector from the viewing device to the remote object;
    a global positioning unit for obtaining a position of the viewing device;
    a microcontroller for calculating the position of the remote object by vector algebra;
    a power supply;
    a network communication link;
    at least one second viewing device separately mounted from the at least one viewing device; and
    at least one servomotor for positioning each of the at least one second viewing device responsive to position calculations of the remote object by the microcontroller transmitted over the network communication link such that each of the at least one second viewing device is directed towards the position of the remote object.

2. The viewing device synchronizer of claim 1 wherein the network communication link is selected from the group consisting of a wireless link, a coaxial communications network, a fiber optic network connection, and a phone line network connection for sending information selected from the group consisting of a direction, global positioning unit reading, angle, and distance to the at least one second viewing device.

3. The viewing device synchronizer of claim 1 wherein the power supply is selected from the group consisting of a battery, fuel cell, solar panel, wind turbine, and low voltage direct current connection.

4. The viewing device synchronizer of claim 1 wherein the microcontroller includes a memory device for storing a direction, altitude, distance, angle, and approximate global positioning unit position for returning to view an object.

5. The viewing device synchronizer of claim 1 wherein the viewing device synchronizer is an autonomous device capable of viewing an object with or without an instruction from a user or over the network communication link.

6. The viewing device synchronizer of claim 1, wherein the at least one second viewing device is interconnected by the network communication link in order to view a single remote object simultaneously.

7. The viewing device synchronizer of claim 6 wherein any one of the at least one viewing device or the at least one second viewing device can control the other of the at least one viewing device or the at least one second viewing device by sending information necessary to view an object.

\* \* \* \* \*

UNITED STATES PATENT AND TRADEMARK OFFICE
CERTIFICATE OF CORRECTION

PATENT NO.         : 8,830,576 B1                         Page 1 of 1
APPLICATION NO.    : 11/086098
DATED              : September 9, 2014
INVENTOR(S)        : Scott A. Morton It is certified that error appears in the above-identified patent and that said Letters Patent is hereby corrected as shown below:

On the Title Page, Item (75) lists Scott A. Morton and Samuel J. Marcy as inventors.

Please delete "Samuel J. Marcy" as inventor.

Signed and Sealed this
Sixth Day of January, 2015

Michelle K. Lee
*Deputy Director of the United States Patent and Trademark Office*